United States Patent [19]

Huynh

[11] Patent Number: 5,448,456
[45] Date of Patent: Sep. 5, 1995

[54] COMBINATION BRAKE LIGHT AND RADIO ANTENNA

[76] Inventor: Steven Huynh, 15349 Van Buren St. #C, Midway City, Calif. 92655

[21] Appl. No.: 261,412

[22] Filed: Jun. 17, 1994

[51] Int. Cl.$^6$ .............................................. B60Q 1/44
[52] U.S. Cl. ...................................... 362/80; 343/712; 343/721; 312/83.3; 340/479
[58] Field of Search ............... 343/721, 872, 873, 713, 343/712; 340/479, 432, 478; 362/61, 80, 240, 252, 251, 237, 217

[56] References Cited

U.S. PATENT DOCUMENTS

| | | | |
|---|---|---|---|
| 2,252,395 | 8/1941 | Cohen | 343/721 |
| 2,586,643 | 2/1952 | Garlow | 343/721 |
| 3,213,419 | 10/1965 | Stults | 340/479 |
| 3,506,956 | 4/1970 | Kolm et al. | 343/721 |
| 4,100,547 | 7/1978 | Cooke | 343/721 |
| 4,309,094 | 2/1982 | Gardner, III | 343/721 X |
| 4,755,791 | 7/1988 | Kuroda | 343/721 |
| 5,150,098 | 9/1992 | Rakow | 340/479 |

Primary Examiner—Stephen F. Husar
Assistant Examiner—Thomas M. Sember
Attorney, Agent, or Firm—Macro-Search Corp. Irvine, Gene Scott

[57] ABSTRACT

A combination brake light and radio antenna is disclosed. An elongated support structure includes a base for mounting to an automobile. At least one side wall of the device is made of a transparent or translucent material, such that lamps arranged in a linear array from the base to a top portion of the structure are visible from outside of the structure when the lamps are illuminated. A lamp driving circuit includes a power source and a switch for closing the circuit in response to a brake pedal of the automobile being depressed. The lamp driving circuit may illuminate the lamps in sequence, such as from bottom to top, for example, when the brake pedal is depressed. Further, the lamp driving circuit may illuminate the lamps at a brightness that is proportional to the pressure that is applied to the brake pedal, such that a relatively high application of pressure to the brake pedal results in the lamps being relatively brightly illuminated. An antenna wire from an appliance in the automobile is connected to the structure, which acts as an antenna in one embodiment.

8 Claims, 2 Drawing Sheets

COMBINATION BRAKE LIGHT AND RADIO ANTENNA

FIELD OF THE INVENTION

This invention relates generally to radio antennas and vehicle brake lights, and, more particularly, is directed to a combination brake light and radio antenna.

BACKGROUND OF THE INVENTION

In traffic, it is vitally important for drivers to see the brake lights of the vehicles that they are following, particularly at higher speeds. Until recently, vehicles typically had only two such brake lights mounted in a low position of the rear of the vehicle. Recently, however, vehicle manufacturers have added an additional brake light mounted at a higher position than the first two brake lights. Such a third brake light is more readily seen by following drivers since it is higher off of the ground and tends to be more at the eye-level of the following drivers. However, none of the three brake lights of a vehicle are readily seen more than one car back from the vehicle. As a result, if an emergency stop is required on a road, each driver must in turn depress his brakes before the car behind him knows that a sudden stop is required. If one driver should fail to respond to the brake lights of the vehicle in front of him, the cars following him may not be alerted brake lights in time to react safely. Also, if a vehicle starts to brake during evening hours when running lights are already illuminated, it may be difficult for a following driver to recognize if brake lights are illuminated or if the running lights are just bright, since both sets of lights are red in color. This can cause confusion and a dangerous situation.

As such, there is a clear need for a device that raises the brake light indicators even higher on vehicles than is now common. Such a needed device would be readily visible from several vehicles back, yet would not be visually obtrusive to the driver or neighboring drivers. Such a needed device would preferably not require a separate mounting means, as it would be combined with a radio antenna assembly and thus serve more than one purpose simultaneously. Such a needed device would increase the chances that following drivers are warned about abrupt braking, and thus would generally increase driving safety. The present invention fulfills these needs and provides further related advantages.

SUMMARY OF THE INVENTION

The present invention is a combination brake light and radio antenna. An elongated support structure includes a base for mounting to an automobile. At least one side wall of the device is made of a transparent or translucent material, such that lamps arranged in a sequence from the base to a top portion of the structure are visible from outside of the structure when the lamps are illuminated. A lamp driving circuit includes a power source and a switch for closing the circuit in response to the actuation of a brake pedal. The lamp driving circuit may illuminate the lamps in sequence, such as from bottom to top, for example, when the brake pedal is depressed. Further, the lamp driving circuit may illuminate the lamps at a brightness that is proportional to the pressure that is applied to the brake pedal, such that a relatively high application of pressure to the brake pedal results in the lamps being illuminated relatively brightly. An antenna wire from an appliance in the automobile is connected to the structure, which acts as an antenna in one embodiment.

The present invention raises the brake light indicators higher on vehicles than is now common. The present device is readily visible from several vehicles back, yet does not visually obstruct the view of the driver or neighboring drivers. The present device does o not require a separate mounting means, as it is combined with a radio antenna assembly and thus serves more than one purpose simultaneously. The present invention increases the chances that following drivers are warned about abrupt braking, and thus generally increases driving safety. Further, the present invention is relatively easy to install in pre-existing vehicles, yet may also be readily included in vehicles during manufacturing thereof. Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
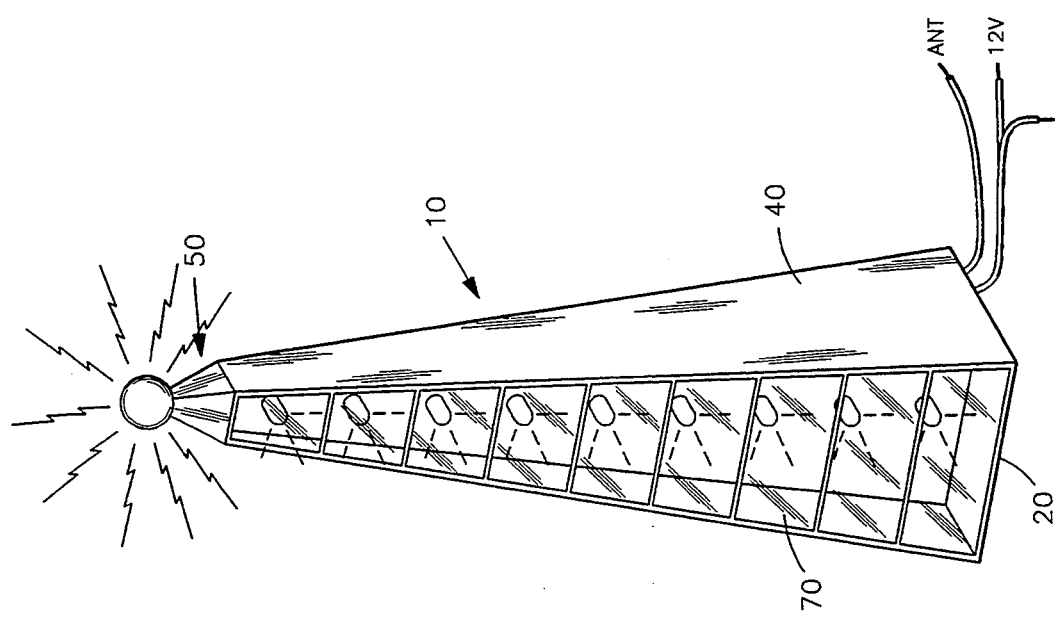
FIG. 1 is a perspective illustration of a first embodiment of the invention, illustrating a support structure having a base and side walls, one of the side walls of which includes a transparent portion through which illuminated lamps are visible from outside of the structure.

FIG. 1 shows a combination automotive brake light and radio antenna. An elongated support structure 10 includes a base 20 that is mounted upon an automobile 30. The base 20 may mount to pre-existing radio antenna holes formed in the automobile 30 with conventional antenna mounting means, such as a bolt and nut arrangement (not shown). Further, the base 20 may be mounted to the automobile 30 through a spring means (not shown) that allows the present invention to be physically disturbed without causing the base 20 to become dismounted from the automobile 30. As such, the invention is less likely to be vandalized or damaged through forceful contact. The structure 10 is preferably two to three feet in height, but may be any other suitable height. One embodiment of the invention (FIG. 2), for instance, is relatively thin and several feet tall, such that the structure 10 assumes a generally thin cylindrical shape.

At least one side wall 40 of non-metallic construction is integrally mounted on the base 20 and extends upwardly from the base 20 to a top portion 50. The base 20, the at least one side wall 40 and the top portion 50, together, are arranged to enclose an interior space 60 within the support structure 10. The at least one side wall 40 has at least one portion 70 thereof that is made from a material capable of passing light therethrough, such as transparent or translucent plastic, glass, or the like. In one embodiment of the invention (FIGS. 1 & 2A), the support structure 10 is generally pyramidal in shape. The top portion 50 is at least partially spherical in shape.

A linear array 80 of individual electric lamps 90 are arranged within the support structure 10 in sequence from the base 20 to the top portion 50. The lamps 90 are positioned so as to be visible through the at least one portion 70 from outside of the support structure 10 when the lamps 90 are illuminated. Alternately, the lamps 90 may be mounted so as to protrude through the side-wall 40, or be mounted directly on the side wall 40. The lamps 90 are interconnected to a lamp circuit 100 that includes a power source (BAT) for supplying a lamp illuminating current and a switch S1 for closing the circuit 100 in response to a brake pedal 130 of the automobile 30 (FIGS. 3 and 4).

Figure 2B:
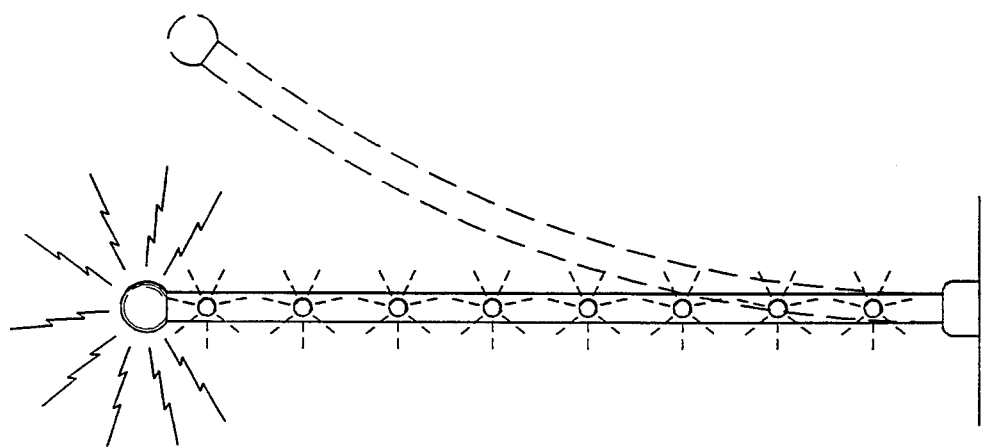
FIG. 2B is a front elevational view of a second embodiment wherein the structure is of a more narrow and flexible nature.
Figure 2A:
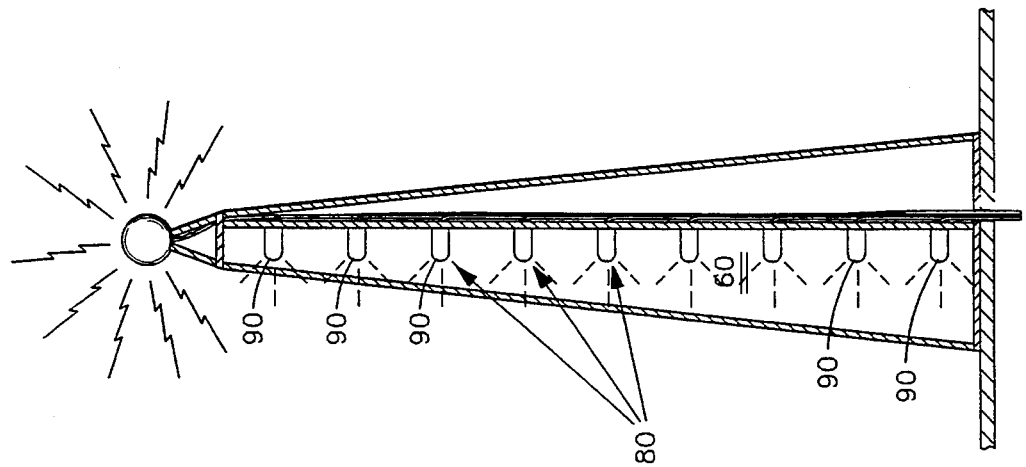
FIG. 2A is a cross-sectional side view of the invention as shown in FIG. 1, illustrating a preferred routing of the wires of the invention.
Figure 3:
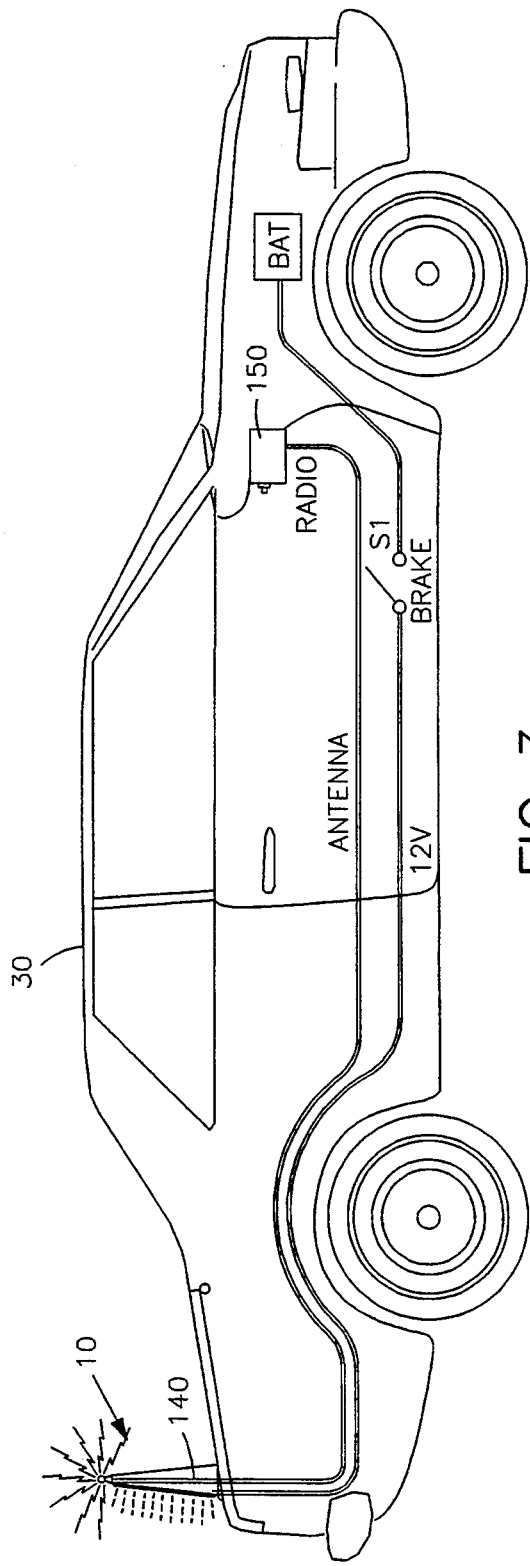
FIG. 3 is a right-side elevational view of the invention, illustrating the invention as mounted to a vehicle and schematically showing a typical electrical circuit of the invention.

In one embodiment of the invention, a linearly configured metallic radio antenna wire 140 is arranged within the support structure 10 and terminates at the top portion 50 (FIG. 3). The wire 140 extends through the base 20 and is interconnected therefrom to an appliance within the automobile 30. Such an appliance is a radio, or the like, that requires a radio antenna for proper operation. In another embodiment of the invention, the support structure 10 is made of a conductive material, such as metal, and itself acts as the antenna (FIG. 2B). In such an embodiment, the antenna wire 140 is electrically interconnected to the structure 10. In yet another embodiment of the invention, the antenna wire 140 could be fixed to one of the side walls 40 and would terminate at the top portion 50.

Figure 4:
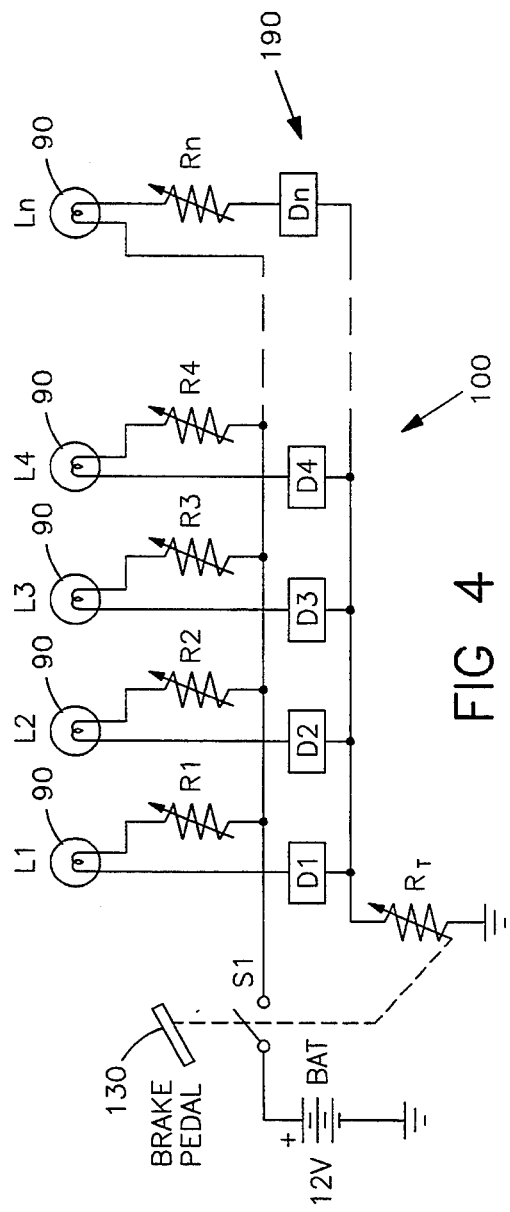
FIG. 4 is a schematic diagram of the invention, illustrating a plurality of delay means resistive means, and lamps.

The lamp circuit 100 may further provide delay means $D_1$–$D_n$, such as an R-C charging means and trigger transistor, for illuminating each one of the lamps 90 individually successively in sequence in response to the brake pedal 130 being depressed (FIG. 4). Further, a master delay means $D_t$ (not shown) of similar construction to $D_1$–$D_n$ could be provided in the lamp circuit 100 for adjusting a set time duration for illuminating all of the lamps 90 at once after the brake pedal 130 has been depressed. Further, the lamp circuit 100 may provide resistive means $R_1$–$R_n$, such as a variable resistor, for setting each of the lamps 90 at a selected relative brightness. Further, a master resistive means $R_t$, of similar construction to $R_1$–$R_n$, may be included for adjusting the illuminating current in accordance with a braking force applied to the brake pedal 130, whereby a greater braking force results in a greater illuminating current for brighter illumination of each lamp 90. Such a master resistive means $R_t$ could incorporate a brake fluid pressure transducer or a brake pedal position sensor, or the like, for establishing a transfer function between braking force on the braking pedal 130 and resistance value of $R_t$.

In operation, when the brake pedal 130 is depressed, the lamps 90 are illuminated in sequence, such as from a bottom lamp 90 to a top lamp 90, within the structure 10. The master resistive means $R_t$ causes the illumination current through the lamps 90 to be proportional to the braking force applied to the brake pedal 130. The circuit 100 could additionally incorporate a standard blinking device such as a multi-vibrator which pulses in proportion to braking force.

While the invention has been described with reference to a preferred embodiment, it is to be clearly understood by those skilled in the art that the invention is not limited thereto. Rather, the scope of the invention is to be interpreted only in conjunction with the appended claims.

What is claimed is:

1. A combination automotive brake light and radio antenna comprising:

an elongate support structure including at least one side wall for mounting upon a vehicle and extending upwardly therefrom and terminating in a top portion, the at least one side wall and the top portion, together, arranged to enclose an interior space within the support structure, and having at least one portion thereof of a material capable of passing light therethrough;

a linear array of individual electric lamps arranged within the support structure in sequence within the structure and positioned so as to be visible through the at least one portion from outside the support structure when the lamps are illuminated, the lamps interconnected to a lamp circuit including a power source for supplying a lamp illuminating current and a switch for closing the circuit in response to a brake pedal of the vehicle, the lamp circuit further providing means for illuminating each one of the lamps individually successively in sequence in response to the brake pedal being depressed, and for adjusting a set time duration for illuminating all of the lamps; and a linearly configured metallic radio antenna means arranged congruent with the support structure and terminating at the top portion, the antenna means further interconnected with an appliance within the vehicle, the appliance requiring the radio antenna for operation thereof.

2. The combination of claim 1 wherein the lamp circuit provides means for setting each of the lamps at a selected brightness.

3. The combination of claim 1 wherein the lamp circuit provides means for adjusting the illuminating current in accordance with a braking force applied to the brake pedal whereby a greater braking force results in a greater illuminating current and brighter illumination of the lamps.

4. The combination of claim 1 wherein the support structure is pyramidal in shape.

5. The combination of claim 1 wherein the top portion is at least partially spherical in shape.

6. The combination of claim 1 wherein the structure is make of a resilient and flexible material.

7. The combination of claim 1 wherein the antenna means is a wire routed within the structure.

8. The combination of claim 1 wherein the antenna means is at least one portion of the structure.

* * * * *